Dec. 17, 1963 W. H. PALMER ETAL 3,114,169
INTERNALLY HEATED DIE PLATE FOR POLYETHYLENE EXTRUDER
Filed July 20, 1960
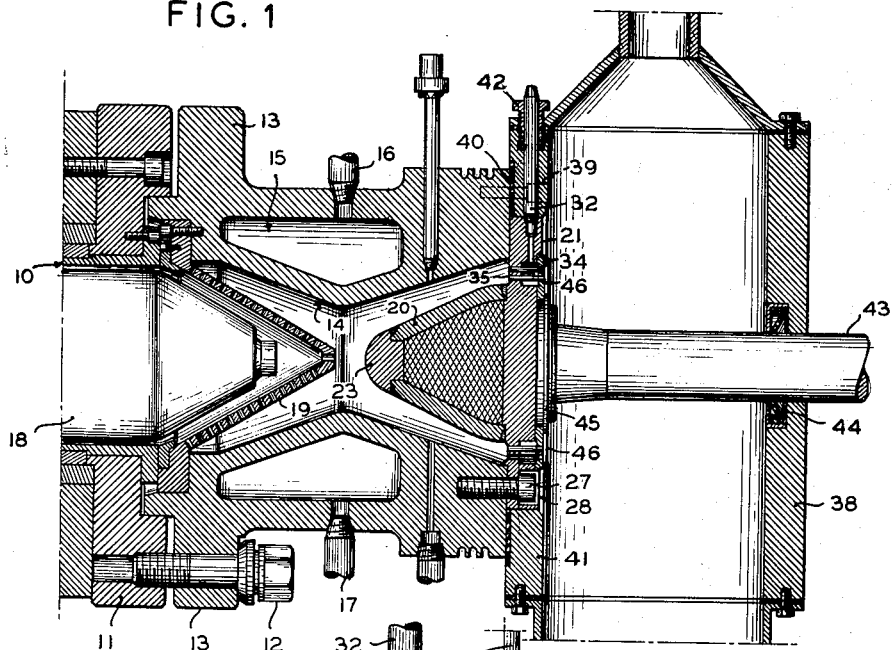
INVENTORS
WILLIAM H. PALMER
BRUCE M. HANNON
BY E. Janet Berry
ATTORNEY

United States Patent Office 3,114,169
Patented Dec. 17, 1963

3,114,169
INTERNALLY HEATED DIE PLATE FOR
POLYETHYLENE EXTRUDER
William H. Palmer, Champaign, and Bruce M. Hannon,
Ivesdale, Ill., assignors to National Distillers and Chemical Corporation, New York, N.Y., a corporation of
Virginia
Filed July 20, 1960, Ser. No. 44,185
4 Claims. (Cl. 18—12)

This invention relates to an apparatus for extruding thermoplastic polymeric materials and more particularly to a novel die plate having particular utility in connection with extrusion apparatus.

In the commercial utilization of thermoplastic compositions for either injection molding, compression molding, or the like, it is desirable that such materials be provided or produced in the form of free-flowing granules of substantially uniform particle size. Heretofore various methods have been utilized for producing such granules, a widely practiced method of great commercial success including devices wherein the thermoplastic material is extruded in the form of rods or spaghetti-like threads which are severed coincident with the extrusion thereof to provide pellets or granules of uniform size.

However, such prior art practices have failed to produce granules of desirable requisite uniform characteristics, consideration being given to size, shape and surface smoothness of the extruded pellet or granule such characteristics being of substantial importance and bearing direct relationship to the relatively low extrusion velocity required in apparatus of the character under discussion.

Another serious defect of such prior art extrusion devices arises out of the plugging of the die under circumstances where production was stopped suddenly, by reason of emergency or otherwise.

It is a particular object of the present invention to provide novel extrusion apparatus wherein plastic materials, and particularly thermoplastic polymeric materials, may be converted into granules of uniform size and shape having completely smooth side surfaces.

It is a further object of the invention to provide novel extrusion apparatus of the class set forth wherein increased diameter of extrusion orifices and/or increased extrusion velocities may be employed without substantially affecting adversely the desired uniform characteristics of the extruded material and granules produced therefrom.

It is a still further object of the present invention to provide a novel die plate for use in extrusion devices wherein provision is made for maintenance of the walls of the orifices at substantially uniformly elevated temperatures while extrudate is passing therethrough.

It is a still further object of the present invention to provide a novel die plate for use in extrusion apparatus of the class set forth wherein stoppage of the extrusion orifices will not occur by reason of cooling or freezing of the extrudate while passing therethrough in the event of sudden interruption of production.

The accompanying drawing illustrates one practical embodiment of the invention, which will be described in detail to enable others to understand and use the same, but the invention is not considered restricted to the specific construction shown in the drawing, reference being made to the claims for summaries of the essentials of the invention and of the novel features of construction and novel combinations of parts for all of which protection is desired.

In the drawings:

FIGURE 1 is a fragmentary sectional view through extrusion apparatus illustrating one embodiment of the present invention;

FIGURE 2 is an enlarged sectional view through applicants' novel die plate; and

FIGURE 3 is a front elevational view of one half of the novel die plate.

In accordance with the present invention, extruded polyethylene pellets of substantially uniform size and shape are produced from a continuous extruded rod, ribbon or other extrudate of polyethylene having a smooth hot-extruded satin surface finish. In the preparation of such products of value in molding operations, the hot polyethylene is extruded through a multiplicity of uniformly heated tubular metal elements of small diameter to give a spaghetti-type product.

In carrying out the present invention, an internally heated die plate is desirably utilized in which the heated molten polyethylene is extruded through the multiplicity of metal tubes to give hot extruded rods or threads or other continuous extrudates which under desirable conditions of production have a hot-extruded satin finish. Desirably, the extruded spaghetti- or other extrudate is cut as desired into pellets by a rotating cutter which slices the extruded material as it emerges from a die or die plate, and preferably the cutting operation is carried out in the cooling bath into which the extrudates are introduced upon emergence from the die or die plate.

By the use of an internally heated die plate as described herein improved uniformity of product is obtained because it is possible to maintain substantially equal temperatures and other conditions at each of the tubes, the latter acting as extrusion orifices. For this purpose, the die structure desirably may be in the form of a heating chamber in which a fluid heating medium is circulated around a multiplicity of tubular metal elements of small diameter through which the polyethylene is conducted. The heating chamber desirably may be annular, with the tubular metal elements arranged in the heating chamber in concentric rings with the tubes equally spaced from one another.

As shown in the drawing, particular reference being had to FIGURE 1 thereof, extrusion apparatus of conventional type has been illustrated including a barrel or casing 10 having a front flange or the like 11 to which a die head 13 is secured by any desired means, such as bolts 12. The die head 13 has the usual throat 14, of hourglass configuration, and also is provided with an annular chamber or passage 15 disposed in surrounding relationship with respect to the throat for the reception of a heating fluid, such as steam or the like, whereby extrudate passing through said throat may be maintained at a desired and predetermined elevated temperature. Inlet and outlet passages 16 and 17, respectively, are provided for the control of heating fluid flow through the channel 15 whereby the temperature of the die head throat 14 may be heated to maintain a substantially constant temperature.

A rotor 18, which may be screw type, is journalled within the casing 10 for forcing hot thermoplastic material into the throat of the die head, such material desirably passing through a mixing screen or grid 19 to insure the thorough blending thereof.

It will be understood that the foregoing die structure is all as is well known in this art and that, in operation, hot thermoplastic material is continuously forced through the mixing screen 19 into the throat 14 of the die head and against the conical projection 20 of the die plate 21, the extrudate being advanced outwardly and toward the extrusion orifices. Desirably, the projection 20 is hollow and may be packed with suitable insulating material 22, such as fiberglass, or the like, and includes a rounded closure or plug 23 securely retained in place as by welding or the like 24.

In the embodiment of the invention illustrated, the inner face of the die plate 21 is provided with a recessed shoulder 25 and the base of the conical projection 20 seats thereupon and is secured thereto by welding or the like as indicated at 26.

The die plate 21 is secured to the outer face of the die head by any desired means such as a series of bolts, screws, or the like 27 extending through apertures 28 provided in the die plate and threaded into complementary apertures in the die head. Additionally, the inner face of the die plate may be provided with an annular rim 29 of a size to fit snugly within the discharge end of the throat 14, the rim including an inwardly inclined surface 30 directed toward the extrusion orifices.

The die plate 21 is provided with an annular chamber or recess 31 which opens outwardly and through which a fluid heating medium such as steam or the like is intended to be circulated for a purpose to be described more fully hereafter, the plate being provided with inlet conduit 32 and outlet 33. It will be noted that the diameter of the heating chamber 31 is greater than that of the enlarged end of the conical projection 20 and a sealing ring or plate 34 is secured to the outer face of the die plate, by welding or the like, to form an effective seal for the chamber 31.

To provide extrusion orifices, a plurality of thin-walled tubular elements 35 are fixedly secured, as by welding, brazing, or the like, within apertures 36 and 37, respectively, in die plate 21 and sealing ring 34. A plurality of such tubular elements have been illustrated, arranged in a circular pattern and, as more clearly illustrated in FIGURE 2 of the drawing, each tubular element extends through the heating chamber 31. Any number of such tubular elements may be employed depending upon the size of the apparatus and the desired diameter in so far as extruded material or prospective granules is concerned. Also, if desired, the dischrge end of each tubular element 35 may be of smaller diameter than the inlet end thereof.

It will thus be understood that each tubular element 35 provides a discharge orifice, extends through the heating chamber 31 and, since each such element is a thin-walled metal tube, uniform heating by the heating fluid in the chamber 31 will be imparted to the extrudate passing therethrough.

While the invention and apparatus are of general utility for the production from thermoplastic and like materials of rods, ribbons, threads, etc., and, if desired, the severance thereof into pellets or granules, under certain conditions it is advantageous that the extrudate pass into a cooling bath and severance into particles of desired size take place in such bath. Suitable structure for accomplishing this end has been illustrated fragmentarily in FIGURE 1 where a vertically disposed water-tight tank 38 is attached to the outer face of the die head 13 as by screws or the like 39, a gasket 40 being interposed between die head and tank. The die plate 21 extends through the inner wall 41 of the tank 38 and where the steam conduit 32 passes through the inner wall 41 a suitable stuffing box 42 is provided.

A rotatable shaft 43, desirably disposed in axial alignment with the extruding element 18, extends into the tank 38 through a water-tight bearing illustrated somewhat diagrammatically at 44 and a cutter assembly including a plate 45 and knives 46 is attached to the inner extremity of the shaft 43. Desirably, spring mechanism (not shown) is provided to insure frictional engagement of the knives 46 with the outer surface of the sealing ring 34 and thus this ring comprises a wear plate for the cutting mechanism.

With a cooling bath as set forth hereabove, severance of the extruded rods into pellets or granules of desired lengths may be accomplished under water, if a sufficient level is maintained within the tank 38; or mechanism may be provided to direct a cooling spray against the extrudate as such material exits from the extrusion orifices. It will be obvious that the severed pellets or granules may be collected below the point of severance or, where such material is of a specific gravity lighter than that of the cooling bath, provision may be made for recovery through a flotation step.

Particularly advantageous results have been obtained in the utilization of the present invention where polymers, such as polyethylene, having a melt index varying from 0.3 to 25.0 have been employed. The granules produced have been particularly uniform in size and shape and have had a smooth, unique satin finish. This is attributed in part to the uniformity of heat maintained in the thin-walled extrusion tubes and such excellence of product has remained constant through extrusion speed variation of from 120″ to 1470″ per minute. The particular finish obtained is controlled by extrusion speed of plastic against smooth metal surface at the temperature employed and will vary with different plastic formulation. For polyethylene, temperatures as given above are desirably used. The unique satin finish of the pellets appears on the extruded faces or walls of the polyethylene pellets. This unique finish is believed to result from the moving contact of the plastic with the metal surface at temperatures of between about 400 and 450° F. at speeds of from about 120″ to 1470″ per minute and may be referred to as an ironed or hot-pressed surface effect. It may be obtained uniformly where temperature is closely and rigidly maintained under conditions to give a surface orientation of the polyethylene.

Desirably, the die plate operating temperature is maintained at from 400° F. to 450° F. in the steam chamber in the die plate and this insures that there will be no adverse cooling of extrudate with resultant deterioration of end product while passing through extrusion orifices.

Moreover, with means provided as shown for maintaining the thin-walled tube structures which provide the extrusion orifices at elevated temperatures, there can be no freezing of extrudate within the orifices and the resultant plugging thereof in the event of any sudden interruption of production whether by reason of malfunction of the apparatus, inadvertence, or otherwise.

It will be readily understood that there are various and obvious additional uses for the present invention and that the utility thereof is by no means limited to the specific embodiment discussed herein. This is equally true whether consideration is given to the specific extrudate employed or to the format thereof. Accordingly, the invention is not considered restricted by that which is shown in the drawing and described in the specification but only as indicated in the accompanying claims.

What is claimed is:

1. In apparatus for producing extruded polyethylene, a sealed heating chamber formed by a die plate and a sealing plate spaced apart from each other, means to introduce and circulate a fluid heating medium within said heating chamber to produce substantially uniform heat therein, and to remove the heating medium after circulation in the heating chamber, a multiplicity of thin walled tubular metal elements extending through said heating chamber for uniform heating therein by said heating fluid, each of said tubuar members being of uniform exterior diameter throughout the entire length thereof and extending transversely through said die plate and said sealing plate and terminating flush with the exterior faces of said plates, each of said tubular elements being of uniform interior diameter extending from the inlet end thereof and continuing through the heating chamber, and means to introduce polyethylene into and out of the tubular members for extrusion through the heating chamber to form a spaghetti type product whereby the polyethylene is extruded from the tubular members as an extrudate having a smooth hot-extruded satin surface finish.

2. Apparatus as set forth in claim 1 where each of said tubular members is provided with a discharge terminal of reduced interior diameter located within the extremity thereof which passes through said sealing plate.

3. Apparatus as set forth in claim 2 where said tubular members are disposed in concentric rings and are spaced apart equally from one another.

4. A die plate including a central portion of reduced thickness, an annular recess located within said central portion and an annular shoulder surrounding said recess, a sealing ring seated against said shoulder and closing said recess to provide a sealed chamber in said die plate, the inner face of said sealing ring being provided with an annular recess aligned with and complementary to that of said die plate, a plurality of thin walled tubular members extending transversely through said die plate and terminating flush with the side walls thereof, said tubular members being equally spaced from one another and arranged in concentric circles located within the confines of said aligned recesses, one extremity of each of said tubular members being secured within said die plate and the opposite extremity of each of said tubular members being secured within the sealing ring, each of said tubular members having a discharge terminal of reduced interior diameter located within the portion thereof secured within said sealing ring, each of said tubular members being of uniform internal diameter extending from the inlet end thereof and continuing through said sealed chamber, and means for supplying a fluid heating medium to said sealed chamber for uniformly heating said tubular members, said means including inlet and outlet passages extending into said die plate and communicating with said sealed chamber.

References Cited in the file of this patent

UNITED STATES PATENTS

| 421,700 | Griesner | Feb. 18, 1890 |
| 2,759,219 | Meakin | Aug. 21, 1956 |
| 2,918,701 | Hull et al. | Dec. 29, 1959 |
| 2,965,925 | Dietzsch | Dec. 27, 1960 |

FOREIGN PATENTS

| 694,870 | Great Britain | July 29, 1953 |

OTHER REFERENCES

British Plastics, February 1960, vol. 33, No. 2, page 71, copy in 18–57TT.